Feb. 4, 1941. H. G. WOMMER 2,230,983
PILOT GUIDE FOR VALVE SEAT FINISHING TOOLS
Filed July 29, 1940
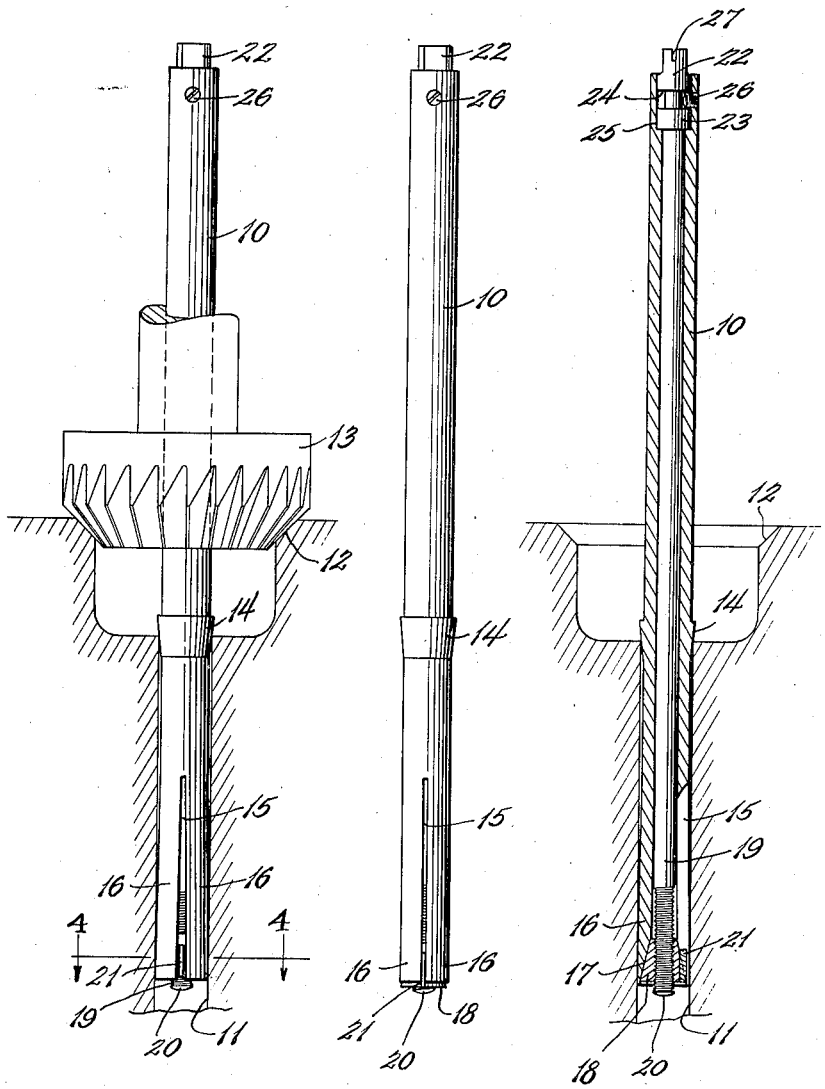
Inventor
H. G. Wommer
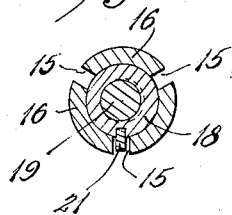
Attorney Patented Feb. 4, 1941

2,230,983

UNITED STATES PATENT OFFICE 2,230,983

PILOT GUIDE FOR VALVE SEAT FINISHING TOOLS

Howard G. Wommer, Millersburg, Pa., assignor to Keystone Reamer & Tool Company, Millersburg, Pa., a corporation of Pennsylvania Application July 29, 1940, Serial No. 348,280

3 Claims. (Cl. 90—12.5)

This invention relates to pilot guides for valve seat finishing tools, such as valve seat reamers and, among other objects, aims to provide an improved, relatively simple, dependable and economical tool of this type which is easy to anchor in and remove from the valve stem guides of internal combustion engines.

Other aims and advantages of the invention will appear in the specification, when considered in connection with the accompanying drawing, wherein:

Fig. 1 is a side elevation of a tool embodying the invention showing a reamer applied to a valve seat;

Fig. 2 is a side elevation of the pilot, alone; and

Fig. 3 is a vertical sectional view of the pilot anchored in a valve stem guide.

Fig. 4 is a horizontal sectional view of the pilot taken on the line 4—4 of Fig. 1.

Referring particularly to the drawing, the preferred embodiment of the tool comprises a tubular spindle or pilot member 10 adapted to be anchored at its lower end in a valve stem guide 11 and perfectly centered with respect to the valve 12 to serve as a guide for an ordinary reamer 13 or other valve finishing tool rotatably mounted on its upper end. The tool is designed to be manipulated from its upper end, firmly to anchor it in the lower end portion of the valve stem guide and enable it to be removed.

In this instance, the pilot has the usual frusto-conical enlargement 14 intermediate its ends adapted to be seated in the upper end of the valve stem guide. Its lower end portion is slightly smaller than the valve stem guide and is split radially and longitudinaly by three or more kerfs or saw-cuts 15 extending through the lower end to provide expansible tongues or fingers 16 and the lower end of the tool is counterbored to present an upwardly tapered frusto-conical seat 17 cooperating with an expanding nut 18 threaded on the lower end of a stem or rod 19 extending through the upper end of the pilot. The lower end of the rod is peened or battered at 20 to hold the nut on it and the nut has a locking feather or lateral projection 21 extending into one of the kerfs to prevent the nut from turning relative to the pilot.

The upper end of the rod 19 has an enlarged non-circular manipulating head 22 and a spaced annular shoulder 23 separated therefrom by an annular groove 24 and seated in a cylindrical counterbore 25 in the upper end of the pilot. A set screw 26 engages the groove 24 and serves as an abutment for the rod when it is unscrewed and causes the expanding nut to be forced downwardly to release the expanded fingers from the valve stem guide. The head of the set screw does not project beyond the outer surface of the pilot so that it does not interfere with the slidable insertion or removal of the reamer. The head 22 is also provided with a screw driver slot 27 so that it may be operated by a wrench or screw driver.

From the foregoing description, it will be seen that the pilot is easy to manufacture and very simple in its operation. It is only necessary to drop it in a valve stem guide and turn the stem or rod until it is firmly anchored and centered. The expansible end is spring tempered so that it will contract when the expansion nut is loosened, thus freeing the pilot to be withdrawn.

Obviously, the present invention is not restricted to the particular embodiment thereof herein shown and described.

What is claimed is:

1. A pilot for valve seat finishing tools comprising, in combination, a tubular spindle having a frusto-conical enlargement adapted to be seated and centered in the upper end of a valve stem guide and a split expansible lower end to extend into the guide; an expander element in the split end; and a rod extending through the upper end of the tubular spindle connected to operate the expander element.

2. A pilot for valve seat finishing tools comprising, in combination, a tubular spindle having a frusto-conical enlargement adapted to be seated and centered in the upper end of a valve stem guide and a split expansible lower end to extend into the guide; a frusto-conical counterbore in the lower end of the tubular spindle; an expander element coacting with the tapered counterbore and interlocked with the split end of the spindle to prevent relative rotation; and an operating rod extending through the upper end of the spindle and screw threaded into said expander element; and means on the rod above the upper end of the spindle whereby the rod may be turned to anchor and release the spindle.

3. A pilot for valve seat finishing tools comprising, in combination, a tubular spindle having a frusto-conical enlargement adapted to be seated and centered in the upper end of a valve stem guide and a split expansible lower end to extend into the guide; a frusto-conical counterbore in the lower end of the tubular spindle; an expander element coacting with the tapered counterbore and interlocked with the split end of the spindle to prevent relative rotation; an operating rod extending through the upper end of the spindle and screw threaded through said expander element and peened on its lower end; the upper end of said spindle having a cylindrical counterbore; a shoulder on the rod seated in the counterbore; an annular groove in the rod within the counterbore and a set screw extending through the side of the spindle into said groove acting as an abutment for loosening the expander element; and a head on the upper end of the rod permitting it to be turned to anchor and release the spindle.

HOWARD G. WOMMER.